UNITED STATES PATENT OFFICE.

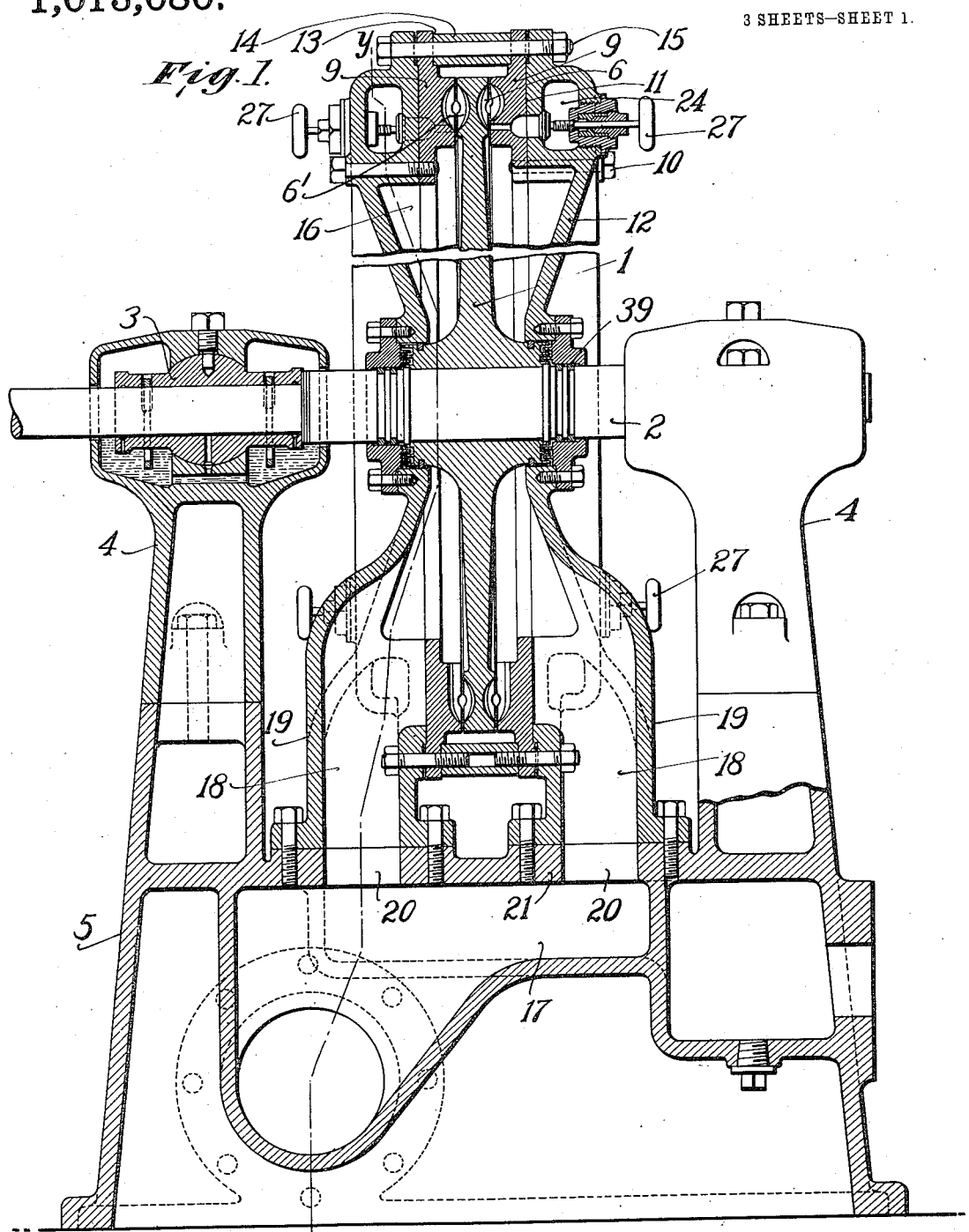

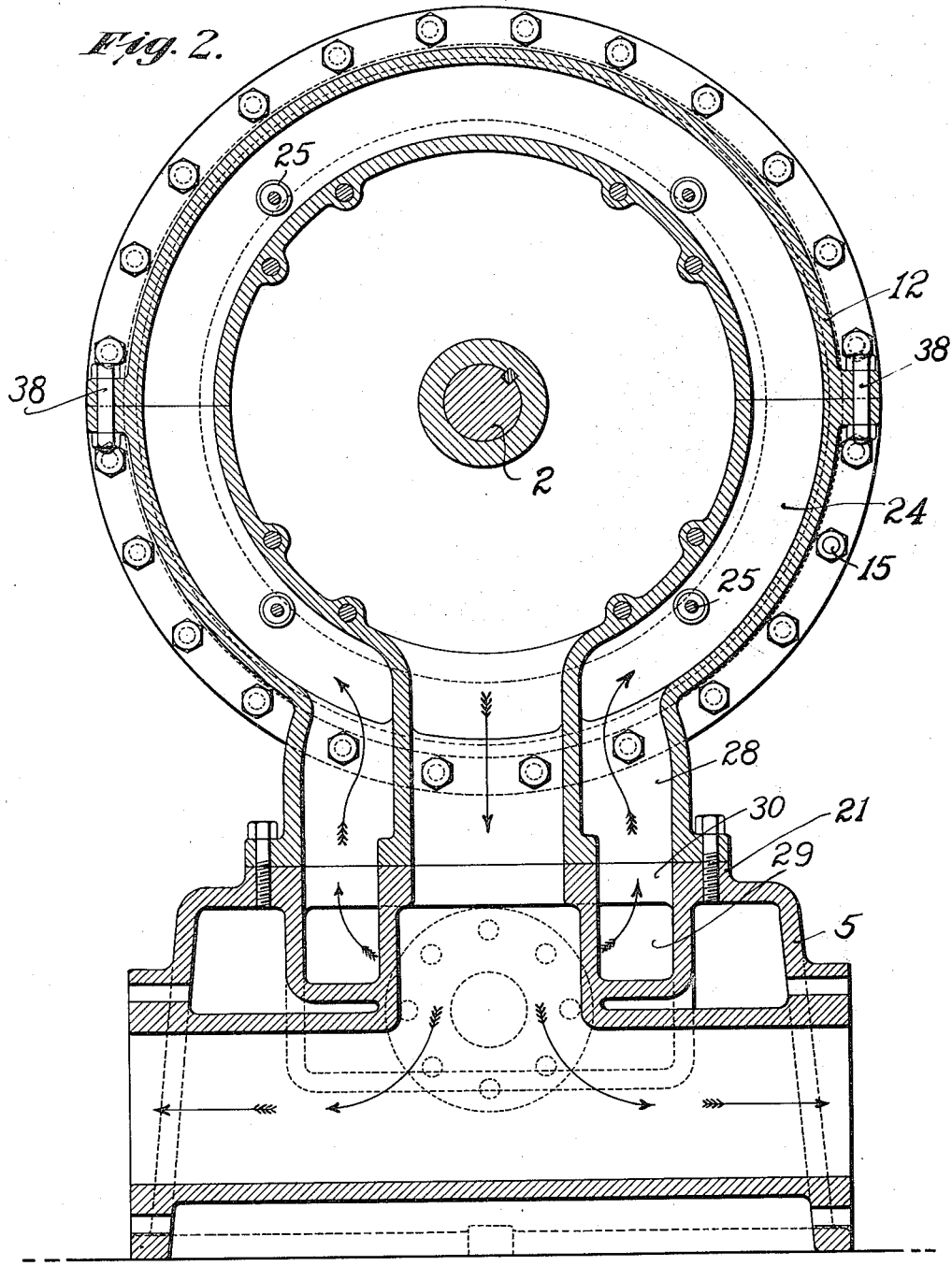

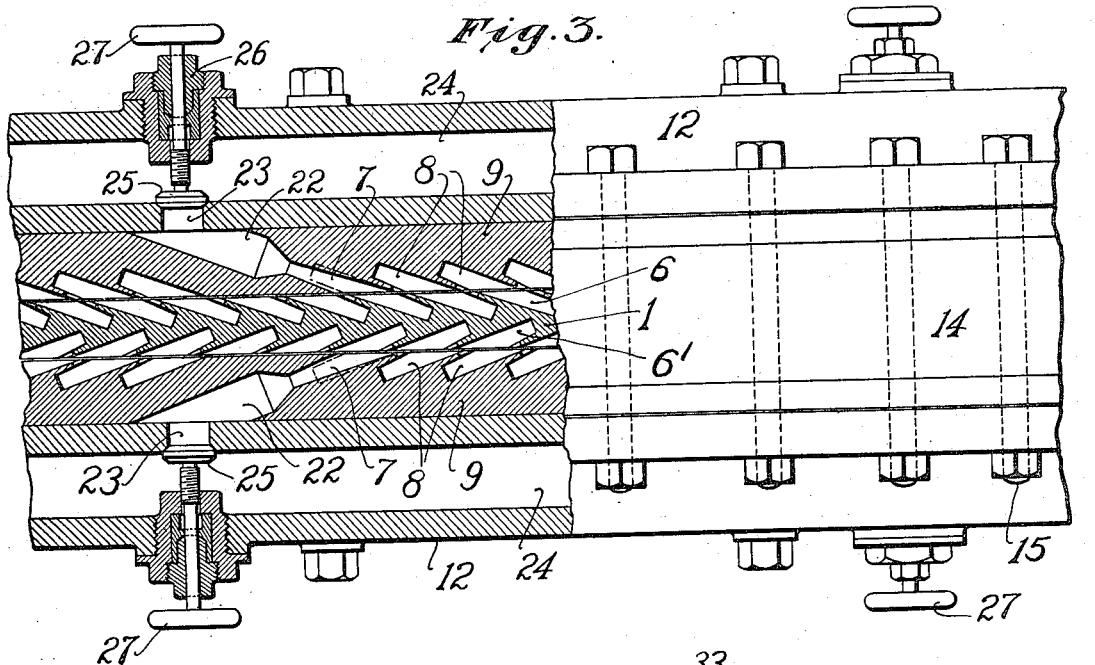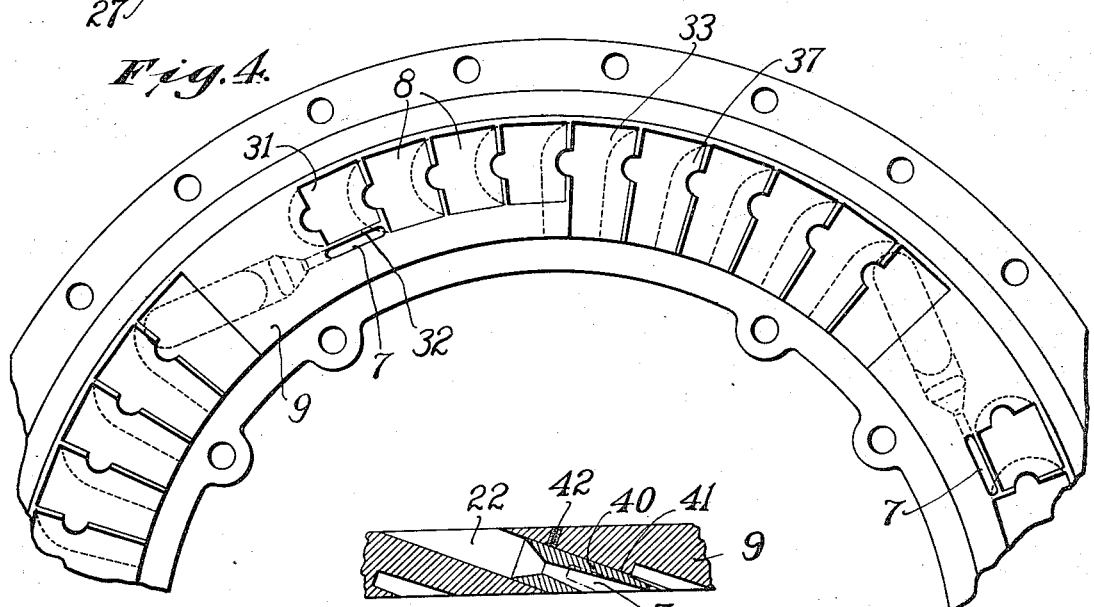

WILLIAM E. SNOW, OF DEDHAM, MASSACHUSETTS, ASSIGNOR TO B. F. STURTEVANT COMPANY, OF BOSTON, MASSACHUSETTS, A CORPORATION OF MASSACHUSETTS.

TURBINE.

1,013,080.      Specification of Letters Patent.      Patented Dec. 26, 1911.

Application filed June 6, 1907. Serial No. 377,535.

*To all whom it may concern:*

Be it known that I, WILLIAM E. SNOW, a citizen of the United States, residing at Dedham, in the county of Norfolk and State of Massachusetts, have invented certain new and useful Improvements in Turbine-Engines; and I do hereby declare the following to be a full, clear, and exact description of the invention, such as will enable others skilled in the art to which it appertains to make and use the same.

The invention relates to elastic fluid turbines, and more especially to that class of turbines in which the rotor buckets or blades are of the parallel-return type, and its object is to increase the power and efficiency of this class of turbines.

In accordance with one of the principal features of the invention, the rotor is in the form of a ring or disk provided on its opposite faces with similarly arranged series of rotor buckets, and the stator is provided with corresponding series of return guides or buckets arranged to return the motive fluid discharged from the buckets in each of the rotor series to rotor buckets in the same series. The stator buckets are arranged on opposite sides of the rotor and the motive fluid is supplied to the rotor buckets through nozzles arranged on opposite sides of the rotor, the result being that a perfect balancing of the end thrust on the rotor is secured. A further advantage resulting from this construction and arrangement is that substantially double the power may be obtained with the same diameter of rotor and same speed of rotation as would be obtained with a rotor having the buckets arranged upon one side only thereof. In practicing this feature of the invention I prefer to stagger the rotor buckets in the two series on opposite sides of the rotor, since with this arrangement the thickness of the rotor disk at or near the periphery where the speed is the greatest may be reduced to a minimum and at the same time the buckets in each of the two series may be arranged in close proximity to each other.

In accordance with another feature of the invention, the stator buckets which are in line radially with the nozzles which direct the motive fluid into the rotor buckets, and which I term the starting buckets, are separated from the discharge end of the nozzles so that the motive fluid is not discharged by the nozzles through the starting buckets. With the nozzles and starting buckets thus discharging separately into the rotor buckets, the jet of motive fluid which is being returned by the starting bucket to the rotor buckets does not strike the nozzle jet at an angle and interfere with its efficient action, as is the case when the nozzle jet enters through the bucket. On the contrary, the nozzle and bucket jet are directed in parallel relation into the rotor buckets, and thus the full efficiency of both the jet returned by the starting bucket and the nozzle jet is secured.

In accordance with a further feature of the invention, the buckets or guides of the stator through which the motive fluid from the rotor buckets is exhausted, are so arranged that the exhaust jets from the rotor buckets are deflected as they exhaust from the rotor buckets with a resulting increase in the reactive action of the jets as they exhaust and an increase in the efficiency of the machine. In practicing this feature of the invention it is preferred to employ a series of exhaust buckets or guides separated by intervening partitions so that the exhausting motive fluid may be directed away from the rotor disk in a general radial direction, and the tendency for the exhaust to be drawn into the empty rotor buckets be thus counteracted.

A further feature of the invention contemplates the supplying of the motive fluid to the nozzles, which are arranged at intervals along the series of rotor buckets, from an annular supply-chamber arranged about the stator buckets so as to form in effect a jacket which reduces the condensation losses in the rotor and stator buckets. In case the rotor is constructed in accordance with the feature of the invention first mentioned, two such annular supply chambers are provided, one on each side of the rotor so that both sides of the rotor and both series of stator buckets are jacketed, with a resulting reduction in condensation losses.

A further feature of invention which contributes to the simplicity of the mechanical construction of the machine and to the convenience and cheapness of construction, consists in forming the stator buckets in one or more rings as the case may be, which are secured to the inner faces of the turbine casing.

A further structural feature of the invention consists in forming the turbine casing of two end sections and an interposed spacing ring formed in segmental sections so that one or more of the sections may be readily removed for the purpose of the repair or inspection of the rotor or stator rings. This construction is also of advantage in that it enables an accurate spacing of the stator rings and an accurate adjustment of the rotor in setting up or readjusting the turbine.

A further structural feature of the invention consists in providing the base of the turbine with exhaust and supply chambers and leading the supply and exhaust through chambers formed in the feet of the rotor casing.

While I prefer to embody the various features of the invention in a turbine in which the rotor is provided with two similarly arranged series of buckets on its opposite faces, it will be understood that various features of the invention may be employed with advantage in turbines in which the buckets are formed upon one side only of the rotor, and that certain features of the invention may be embodied in turbines in which the rotor buckets are otherwise arranged.

The various features of the invention will be readily understood from an inspection of the accompanying drawings, in which turbine is shown embodying such features in the forms in which I prefer to use them.

In these drawings Figure 1 is a vertical longitudinal section; Fig. 2 is a vertical section on the line y—y, Fig. 1; Fig. 3 is a partial plan and sectional view showing the arrangement of the rotor and stator buckets, the nozzles, and the steam supply chambers; Fig. 4 is a partial elevation showing the face of a rotor ring in which the return guide buckets and exhaust buckets are formed; and Fig. 5 is a detail view showing a preferred construction of nozzle.

In describing the construction shown in the drawings it will be assumed for convenience that the motive fluid supplied to the turbine is steam.

As shown in the drawings, the rotor consists of a disk 1 secured to a shaft 2. The shaft is mounted in suitable bearings 3 which are supported in bearing blocks 4 mounted upon the base 5 of the machine. The rotor is provided near its outer edge with two series of buckets 6 and 6' formed in its opposite faces. These buckets are similarly arranged so that the steam directed into the buckets of each series tends to drive the rotor in the same direction. While the buckets are similarly arranged in the two series as indicated in Figs. 2 and 4, the buckets in one series are staggered with relation to the buckets in the other series, since with this arrangement the thickness of the rotor rim may be reduced.

Jets of steam are directed into the rotor buckets by two series of nozzles 7 arranged on opposite sides of the rotor and the steam discharging from each series of buckets is returned into the same series of buckets by means of return buckets or guides 8 formed in the stator rings 9. The stator rings are arranged on opposite sides of the rotor in close proximity to the opposite faces of the rotor. These rings are secured by means of bolts 10 to annular faces 11 formed upon the inner sides of the end sections 12 of the rotor casing. The stator rings are provided at their outer edges with annular grooves 13 within which the segmental sections of an annular spacing ring 14 are secured by means of bolts 15 which pass through the end sections 12, stator rings 9 and spacing ring. The spacing ring, together with the end sections and the stator rings which are secured thereto, form the casing which incloses the rotor. The end sections 12 are so shaped that annular spaces or chambers 16 are formed between the inner walls of these sections and the rotor disk 1 through which the steam exhausted from the rotor buckets is discharged. These exhaust chambers 16 communicate with an exhaust chamber 17 formed in the base 5 of the turbine through exhaust passages 18 formed in the legs 19 of the rotor casing and arranged to register with openings 20 in the supporting plate 21 of the base.

The nozzles 7 are formed or mounted in the stator rings 9 and lead from chambers 22 formed in the outer sides of the rings. These chambers 22 communicate through ports 23 with annular supply chambers 24 which are formed in the end sections 12 at the rear of the annular faces 11 to which the stator rings are secured.

The supply of steam through the ports 23 is controlled by valves 25, the stems of which extend through stuffing boxes 26 formed in the outer walls of the end sections of the rotor casing, and are provided with hand wheels 27 by which the valves may be operated. The annular supply chambers are substantially co-extensive with the annular faces 11 to which the stator rings are secured, and form steam jackets about the rotor and stator buckets which act to reduce condensation losses. These annular supply chambers communicate through passages 28 formed in the legs 19 of the rotor casing with a steam supply chamber 29 formed in the base 5 of the turbine, the ends of the passages 28 being arranged to register with openings 30 in the supporting plate 21 of the base. In the preferred arrangement of the exhaust and supply passages through the legs of the rotor casing, the exhaust passages 18 are arranged between the supply passages 28 as indicated in Fig. 2, so that the exhaust steam passing through the passage 18 will tend to heat the walls of the steam passages and thus tend to reduce the condensation losses in the live steam passages.

The nozzles 7 through which the steam is directed into the rotor buckets are preferably arranged so that their discharge ends are in substantially axial alinement on opposite sides of the rotor, as with this construction the end thrust and axial strains upon the rotor are more evenly balanced. The discharge end of each nozzle is arranged to direct a jet of steam into the lower sides of the rotor buckets, and in starting the turbine the jet of steam discharged into a rotor bucket by a nozzle is discharged from the upper side of the bucket into a return bucket 31 formed in the stator ring 9 directly above the discharge end of the nozzle, as indicated in Fig. 4. When the rotor has acquired its normal speed, the steam discharged from the nozzle into the rotor buckets will be discharged from said buckets into the return buckets 8 which are formed in the stator ring in advance of the bucket 31. The bucket 31 which operates to return the steam during the starting of the rotor, and which is therefore termed a starting bucket, is separated from the nozzle by a thin partition 32 so that the steam received by the bucket 31 from the rotor buckets does not strike against the jet of steam being delivered by the nozzle but is deflected by the bucket so that when leaving the bucket it is traveling in a direction parallel with the nozzle jet. Thus the jet of steam returned by the starting bucket does not interfere with the nozzle jet, and the full efficiency of both jets is secured.

After passing the return buckets 8 the rotor buckets discharge the steam contained therein into a series of exhaust buckets or guides 33 formed in the stator ring in advance of the return buckets 8. These exhaust buckets are provided with deflecting surfaces at their upper edges which act to deflect the steam exhausting from the rotor buckets and to direct this steam in a substantially radial direction. By thus deflecting the steam as it exhausts from the rotor buckets, its re-active effect upon the rotor buckets is increased with a resulting increase in the efficiency of the turbine. A series of exhaust buckets are provided which are separated by intervening partitions 37 so that the steam exhausting from the rotor buckets is prevented from traveling circumferentially with the buckets and being drawn into the empty buckets.

Each end section 12 of the rotor casing is formed in two sections which are secured together by bolts 38, and each end section is provided with a packing ring 39 surrounding the shaft 2 and suitably constructed to prevent the escape of steam from the exhaust chambers within the casing. The spacing ring 14 is also formed in two sections, the ends of which are secured together by bolts similar to the bolts 38. This sectional construction of the spacing ring enables the upper section of the ring to be removed without disturbing the other parts of the rotor casing, in case it is desired to inspect or repair the rotor or stator rings. The segmental spacing ring also enables the rotor to be accurately adjusted with relation to the stator rings in setting up or readjusting the turbine, since the upper section of the spacing ring need not be secured in place until after the other parts of the rotor casing have been assembled and the rotor properly adjusted.

Although the nozzle 7 may be formed directly in the stator rings 9 as indicated in Figs. 3 and 4, I prefer to form the nozzle in a separate plug or bushing 40 as indicated in Fig. 5. As here shown the nozzle bushing fits within a hole 41 which extends through the stator ring, the outer end of the hole forming the chamber 22 through which the steam is supplied to the nozzle. The nozzle bushing is secured in position by means of a set screw 42 so that it may be readily removed and replaced in case the nozzle becomes worn or in case it is desired to employ a nozzle of different size and capacity. When the removable nozzle such as indicated in Fig. 5 is employed, I prefer to first insert the nozzle bushing, and after it has been secured in place to mill or otherwise shape the end of the bushing in such manner as may be necessary in order to give the required shape to the starting and return buckets.

Having explained the nature and object of the invention and one form of turbine in which the invention may be embodied, what I claim is:

1. A turbine, having, in combination, a rotor disk provided with a series of similarly arranged parallel return buckets on its opposite sides, the buckets in each series being staggered with relation to the buckets in the other series, a series of stator buckets on opposite sides of the rotor buckets arranged to return the motive fluid discharged from the rotor buckets of the corresponding series to rotor buckets of the same series, and supply nozzles arranged in substantially axial alinement on opposite sides of the rotor, substantially as described.

2. A turbine, having, in combination, a rotor provided with parallel-return buckets, a stator provided with starting and return buckets, and a supply nozzle having its discharge end separated from the starting bucket, substantially as described.

3. A turbine, having, in combination, a rotor provided with a series of parallel-return buckets, a supply nozzle and a starting stator bucket arranged to direct substantially parallel jets of motive fluid into the rotor buckets, substantially as described.

4. A turbine, having, in combination, a rotor provided with a series of parallel-return buckets, a stator provided with a supply nozzle and a starting stator bucket arranged to simultaneously deliver into the same rotor bucket, and a partition separating the delivery ends of the nozzle and starting bucket, substantially as described.

5. A turbine, having, in combination, a rotor provided on its side with a series of parallel return buckets, and means for deflecting the motive fluid as it exhausts from said rotor buckets and directing it away in a substantially radial direction, substantially as described.

6. A turbine, having, in combination, a rotor provided with a series of parallel return buckets, and a stator provided with a series of exhaust buckets arranged to deliver the motive fluid in a substantially radial direction, substantially as described.

7. A turbine, having, in combination, a rotor provided with a series of parallel-return buckets, a stator provided with a series of exhaust buckets separated by intervening partitions and arranged to deflect the jets of motive fluid as they exhaust from the rotor buckets, and to direct the motive fluid away from the rotor in a general radial direction, substantially as described.

8. A turbine, having, in combination, a rotor disk provided with a series of parallel-return buckets in one of its faces, a stator provided with return buckets and with exhaust guides arranged to direct the exhaust from the rotor buckets in a general radial direction, substantially as described.

9. A turbine, having, in combination, a rotor disk provided on one of its faces with a series of parallel return buckets, a stator provided with a series of return buckets, a series of supply nozzles arranged to deliver into the rotor buckets, and an annular supply chamber arranged back of the stator buckets to form steam jackets about the buckets and communicating with the nozzles, substantially as described.

10. A turbine, having, in combination, a rotor disk provided with a series of parallel-return buckets, a stator provided with series of return buckets, a series of supply nozzles arranged to deliver into the rotor buckets, and an annular supply chamber arranged about the stator buckets to form a steam jacket therefor and communicating with the nozzles, substantially as described.

11. A turbine, having, in combination, a rotor disk provided on opposite sides with a series of similarly arranged parallel-return buckets, a stator provided with series of return buckets on opposite sides of the rotor disk, supply nozzles arranged at intervals along each side of the rotor disk, and annular supply chambers arranged about the stator buckets to form steam jackets therefor and communicating with the nozzles, substantially as described.

12. A turbine, having, in combination, a rotor disk provided on one of its faces with a series of parallel-return buckets, a rotor casing, and a stator ring secured to the inner face of the casing and provided with series of return buckets, substantially as described.

13. A turbine, having, in combination, a rotor disk provided on opposite sides with similarly arranged series of parallel-return buckets, a rotor casing provided with end sections, stator rings secured to the inner faces of said sections and provided with series of return buckets, substantially as described.

14. A turbine, having, in combination, a rotor disk provided on one of its side faces with a series of parallel return buckets, and a rotor casing comprising two end sections, one of which is provided with return buckets and an interposed spacing ring surrounding the rotor disk, substantially as described.

15. A turbine, having, in combination, a rotor disk provided with a series of parallel return buckets, a casing comprising end sections, a stator ring provided with return buckets secured to the inner face of one of said sections, and a spacing ring surrounding the rotor disk, substantially as described.

16. A turbine, having, in combination, a rotor disk mounted to rotate on a horizontal axis, a rotor casing comprising vertical end sections arranged on opposite sides of the disk, supply and exhaust chambers in the casing, a base on which the casing is supported, supply and exhaust chambers in the base, and passages connecting the supply and exhaust chambers in the base and casing formed in the foot of the casing, substantially as described.

In testimony whereof I affix my signature, in presence of two witnesses.

WILLIAM E. SNOW.

Witnesses:
IRA L. FISH,
ANNIE C. RICHARDSON.